May 9, 1967 R. C. H. SIMPSON 3,318,480

PRINTER TICKET SCANNING APPARATUS

Filed June 7, 1965

INVENTOR.
ROBERT C. H. SIMPSON

BY

Lockwood, Woodard, Smith & Weikart
Attorneys

INVENTOR.
ROBERT C. H. SIMPSON
BY
Lockwood, Woodard, Smith & Weikart
Attorneys

May 9, 1967
R. C. H. SIMPSON
3,318,480
PRINTER TICKET SCANNING APPARATUS
Filed June 7, 1965
3 Sheets-Sheet 3
Fig. 7.
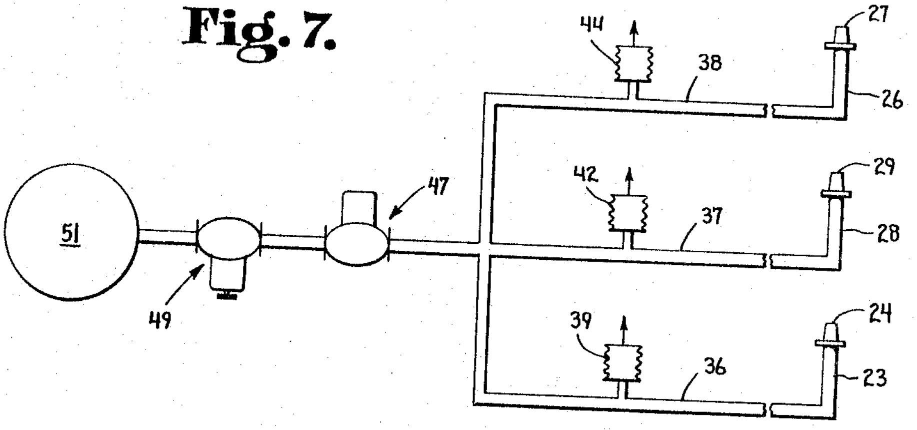
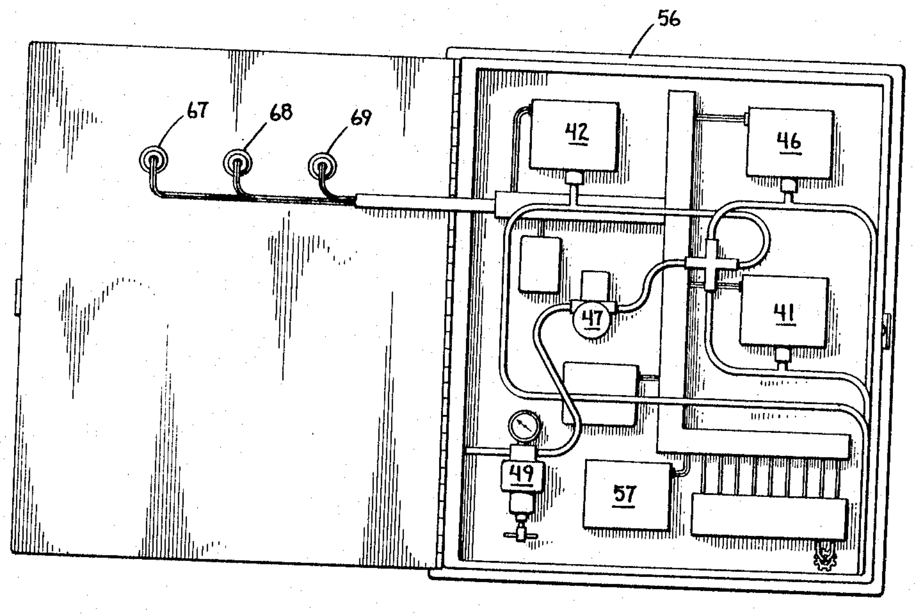
Fig. 8.
INVENTOR.
ROBERT C. H. SIMPSON
BY
Lockwood, Woodard, Smith & Weikart
Attorneys United States Patent Office 3,318,480

Patented May 9, 1967

3,318,480

PRINTER TICKET SCANNING APPARATUS

Robert C. H. Simpson, 6102 N. Parker Ave., Indianapolis, Ind. 46220

Filed June 7, 1965, Ser. No. 462,017
5 Claims. (Cl. 222—30)

This invention relates generally to ticket or invoice scanning apparatus and in particular to a ticket scanning apparatus for use with a ticket printer of the type conventionally used for registering the volume of a product delivered from bulk supply or storage, such as gasoline, fuel oil, etc.

In commercial operations involving the transport of quantities of bulk product from storage to an area of use or consumption, precise cost control of the operation is, usually, quite desirable. An example of such operation is the operation of ready-mix concrete trucks which are customarily fueled from large bulk fuel tanks by each truck operator, the fuel dispensing device at the bulk tank being unattended. A further example is the filling of tank trucks with fuel oil for delivery from a bulk storage depot. While accurate quantity delivery records are necessary for precise cost control, unattended dispensing apparatus at the storage facility is characteristic of these operations because of the saving in labor cost thus achieved.

There are several varieties of meter register and ticket printers commercially available for recording bulk product delivery. Generally, these involve insertion of an invoice-ticket into the printer by the truck operator. He then manually actuates the printer which prints on the ticket in the "start" space a reading from a series of print wheels which identifies the quantitative reference lever (either zero on reset type printers, or prior withdrawal gallonage accumulation) from which the product delivery is to start. This printing operation clears the product dispensing mechanism so that the operator can then actuate the dispensing device, such as a pump, to operative condition. Delivery of the product to the truck then proceeds until terminated by either automatic deactuation of the dispensing device or manual shutting down of the device by the operator. The operator then again manually actuates the printer which then prints on the ticket (which has been retained in the printer during product delivery) in the "finish" space an amount indicating the quantity of product dispensed since the reference level, "start" printing, the difference between the "start" and "finish" quantities representing the delivered quantity of product. After this "finish" printing, the invoice ticket is released by the printer and can be removed by the operator.

In maintaining cost control in the use of such printer-equipped, unattended product dispensing facilities, it is important to assure that product delivery occurs only when an authentic invoice ticket is properly positioned in the printer and to prevent product delivery when a spurious ticket is presented to the printer. Electrical safety codes governing the conditions of delivery of combustible products prevent use of electrical sensing devices, such as position-indicating switches, on the printer for assuring the proper presentation of an authentic ticket to the printer.

The present invention provides a pneumatic means, taking the form of three control-air pressure orifices, positioned on the printer, which, in conjunction with an associated pneumatic circuit and electrical circuit, scans the invoice ticket presented to the printer and prevents operation of the product delivery or dispensing means if the ticket is not authentic or if it has not been fully inserted into the printer. This scanning operation is accomplished by providing invoice tickets having an aperture therethrough at a selected location on the ticket. The control-air orifices are positioned on the printer so that one orifice senses the complete insertion of the ticket, another senses the presence of the identifying aperture in the ticket and a third senses the proper positioning of the printer for the "start" printing operation. All three orifices must indicate its respective condition has been properly fulfilled before the product delivery means, such as an electrically driven pump, can be operated.

The primary object of the present invention, therefore, is to provide a ticket scanning control or attachment for a product delivery ticket printer which permits operation of the product delivery means only if a properly identified ticket is correctly positioned in the printer.

A further object of the present invention is to provide a control or attachment as referred to above in which pneumatic means, rather than electrical means, are used as the sensing elements positioned on the ticket printer.

These and other objects will become apparent as the description proceeds with reference to the accompanying drawings in which:

FIG. 7 is a schematic showing of the arrangement of the pneumatic components of the control of the present invention.

FIG. 8 is a front view of the control box physically housing the electrical and pneumatic components of the control which are remote from the ticket printer, the control box being shown with its front cover open.

Figure 1:
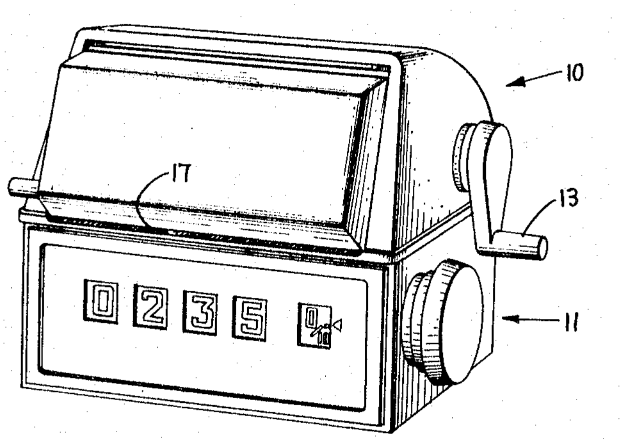
FIG. 1 is a perspective view of a ticket printer of a conventional type on which the apparatus serves as the environment for the control of the present invention.

Referring initially to FIG. 1, there is shown a commercially available ticket printer, indicated at 10, which may be accommodated atop a commercially available meter register indicated generally at 11. These two devices, minus the attachment of the present invention are conventional commercially available structures and are merely illustrative of the type of device on which the control of the present invention can be utilized. The internal parts and functioning of the ticket printer are not described in detail herein since they, in themselves, form no part of the present invention. The meter register and ticket printer illustrated are described in detail in "Meter Register and Ticket Printer" Service Manual (Form No. 227980—March 1963), published by Veeder-Root Inc., of Hartford, Connecticut.

Figure 2:
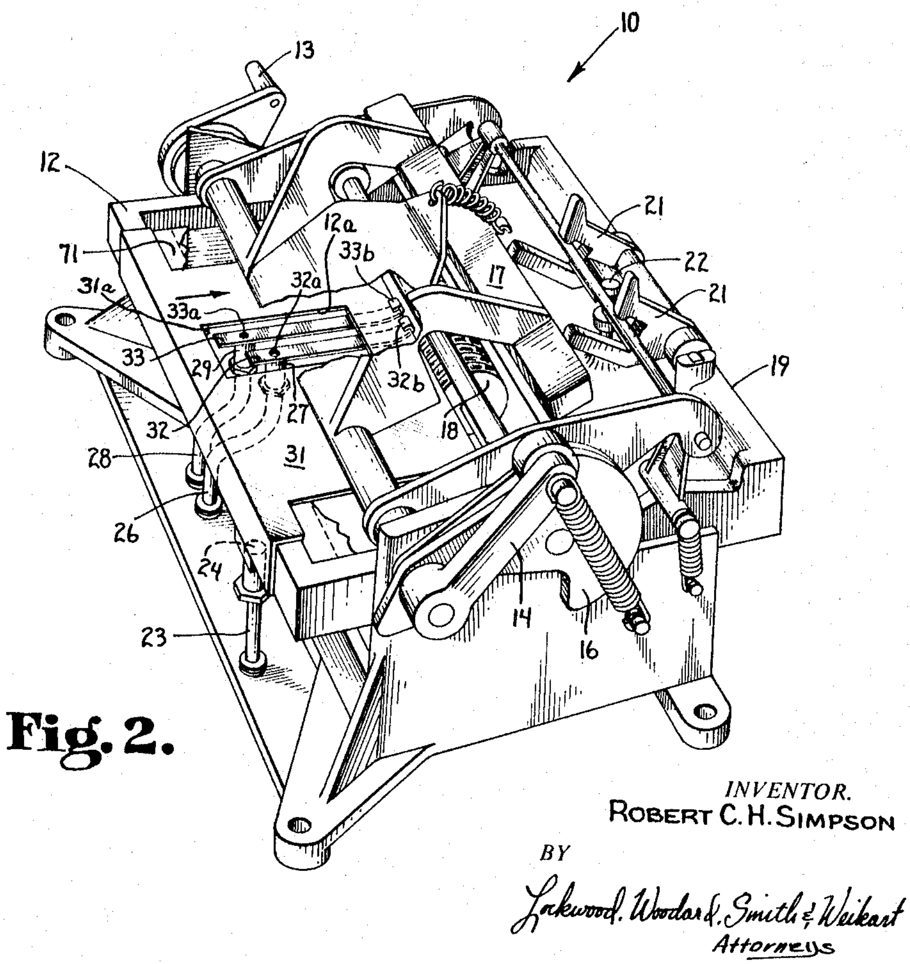
FIG. 2 is a perspective view of the ticket printer structure shown in FIG. 1 with the cover removed and showing the ticket scanning elements of the present invention in place on the ticket printer.

FIG. 2 illustrates the ticket printer with its cover removed. The component parts of the printer which are pertinent to the present invention are a slip tray or invoice-ticket receiving table 12 which is movable between an initial position (shown in FIG. 2) and a "start-print" position horizontally displaced in the direction of the arrow of FIG. 1 from the initial position, the table eventually being returned horizontally back to a "finish-print" position which coincides with the initial position. This horizontal shifting of the table 12 is accomplished by a series of gears and ratchets (not shown) which transmit motion of a manually operable member or crank 13 to the table. As the table moves into the "start-print" position, coaction of a printing arm 14 and a cam 16 cause the rapid downward motion of a stamping pad 17 into engagement with an invoice-ticket which has previously been inserted in the printer from a slot (indicated at 17 in FIG. 1) formed in the stationary frame member 19 of FIG. 2. When inserted, the ticket lies between the stamping pad 17 and the number wheels 18. Dropping of the stamping pad thus imprints on the underside of the invoice ticket the starting product condition indicia; for example, the last product withdrawal quantity reading. The number wheels 18 are rotated through gearing by an element responsive to delivery of the product so that the wheels 18 indicate the quantity of product delivered at any particular moment. The conventional ticket printer also includes a seal pin yoke 21 which functions to lower a seal pin 22 into a ticket inserted in the slot 17, the lowering of the seal pin so as to impale the ticket and retain it against subsequent withdrawal being accomplished through the initial cranking motion of the manually operable member 13.

The structure so far described, it will be understood, is conventional and commercially available. In its operation, the operator of a truck wishing to fill the truck with fuel, for example, inserts an invoice-ticket into the slot 17. He then cranks the member 13 which moves the table 12 rightwardly so that the proper portion of the ticket underlies the stamping pad 17. Further slight movement of the crank 13 drops the stamping pad onto the ticket, printing the indicia from the number wheels in the proper position on the ticket. By a separate on-off switch the operator then starts the pump or other product delivery means and fuel flows to the truck. After the desired gallonage has been dispensed, the operator actuates the on-off switch to off, stopping the product delivery means, and further turns the crank 13. This shifts the table 12 back to its position of FIG. 2, termed the "finish-print" position, in which position the stamping pad is again released to print the finish product condition indicia on the invoice ticket at the proper position, spaced from the start indicia printing because of the shifting of the table 12.

While this structure operates satisfactorily, at unattended product delivery installations, it is vulnerable to the introduction of spurious invoice-tickets, or even an envelope or similar paper fragment whose size corresponds generally to a proper invoice-ticket. The control attachment of the present invention is designed to scan the ticket presented to the printer and to permit actuation of the product delivery means only if an authentic, properly coded invoice ticket is in place in the printer.

The components of the present invention which are attached physically to the printer are shown in FIG. 2. These include a tube 23, terminating at its upper end in a first orifice 24 obstructed by the overlying ticket-receiving table 12 when the table is in its position of FIG. 2. A tube 26, attached to the printer, extends upwardly and terminates at a second orifice 27 which underlies the plate 31 but is positioned in a rectangular cut-away portion **31*a* of the plate, the plate 31 being carried by the table 12**.

A tube 28 attached to the printer frame extends upwardly and terminates in a third orifice 29, also underlying the plate 31 carried by the table 12. A resilient spring blade 32 extends over the orifice 27, the blade having an aperture **32*a* therein registering with the orifice 27. The blade 32 extends beneath the plate 31 and is attached thereto by overlapping the margin of plate 31, as indicated at 32*b* in FIG. 2. A similar resilient blade 33, carrying an aperture 33*a* registering with the orifice 29 is also attached to the margin of the plate 31, as indicated at 33*b*. The function of the spring blades 32 and 33 is to press the invoice ticket against orifices 27 and 29 when the ticket is inserted beneath plate 31 and between the blades 32 and 33 and their adjacent orifices, the apertures 32*a* and 33*a*** preventing obstruction of the orifices when no ticket is present in the printer.

Referring now to FIG. 7, an air pressure line 36 is connected to the tube 23, an air pressure line 37 is connected to the tube 28 and an air pressure line 38 is connected to the tube 26. Communicating with the pressure line 36 and responsive to the pressure therein is the pressure responsive element 39 of a conventional pressure switch (indicated at 41 in FIG. 6). The pressure switch 39–41 is open when control air pressure exists in the line 36 and is closed when the pressure in line 36 drops. Attached to and responsive to the pressure in line 37 is the pressure responsive element 42 of a conventional pressure switch indicated at 43 in FIG. 6. Similarly, a further pressure responsive element 44 of a conventional pressure switch (indicated at 46 in FIG. 6) communicates with and responds to the pressure in line 38. The pressure switch 42–43 closes upon a pressure rise in the line 38 and the pressure switch 44–46 opens on a pressure rise in the line 37, its action in this respect being similar to the action of the pressure switch 39–41.

Figure 6:
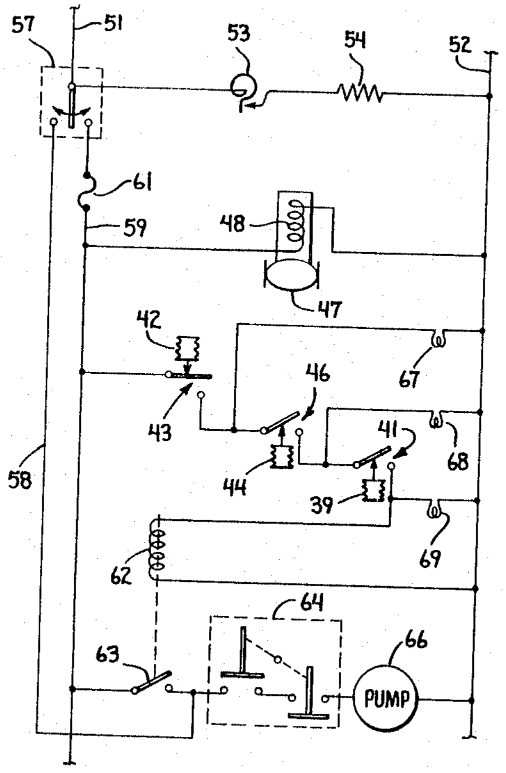
FIG. 6 is a schematic wiring diagram for the control of the present invention.

The pressure lines 36, 37 and 38 join and communicate with an on-off solenoid valve indicated generally at 47 in FIG. 7, the electromagnetic operator for the valve being indicated schematically at 48 in FIG. 6. Connected in series with the solenoid valve 47 is a pressure regulating valve of conventional type indicated generally at 49. The pneumatic circuit just described is pressurized by any suitable means providing a source of control air pressure such as the compressor 51 schematically shown in FIG. 7. It will be understood that the pressure provided by the source 51 can vary over a wide range, the regulating valve 49 serving to provide a substantially constant control air pressure of ten pounds per square inch which has proven to be a satisfactory control air pressure.

Referring now to FIGS. 6 and 8, the electrical wiring of the control components includes line voltage supply wires 51 and 52. Connected across the supply wires is a thermostat 53 which controls power to an electric heater 54, both the thermostat and the electric heater being located within the control box or housing 56 shown in FIG. 8. The function of these two elements is merely to maintain the temperature of the control box at a value sufficient to insure proper operation of the valves and pressure switches in the box. A manually operable double-throw switch 57 selectively connects the input line to a wire 58 or to a wire 59, the wire 59 having interposed therein a suitable fuse 61. The electromagnetic operator coil 48 for the solenoid valve 47 is connected across the wires 59 and 52 and is thus immediately energized whenever the switch 57 is closed to connect wire 51 with wire 59.

The pressure switch contacts 43, 46 and 41 are connected in series with the electromagnetic operator coil 62 for a product delivery controller and these series connected elements are, in turn, connected across the wires 59 and 52. The product delivery controller may take the form of the relay coil 62 as here shown, but, it will be understood, this might also take the form of a pump or an electrically operable flow valve connected directly in the control line rather than through a relay coil and its relay-operated contacts as here disclosed. A switch 63 is closed upon energization of relay coil 62 and this switch is connected in series with a conventional, push-button switch indicated at 64. The switch 63 and push-button switch 64 are connected in series with a product delivery pump 66, it being understood that the pump is merely one form of product delivery means and, where the product is under pressure, might take the form of a flow valve. The wire 58 is connected between the switch 63 and the switch 64 and provides a means whereby the pump 66 may be actuated manually when the switch 57 is moved to its position wherein wire 51 and wire 58 are electrically connected.

Each of the switch contacts 43, 46 and 41 control energization of trouble lights 67, 68 and 69, respectively, these lights, as will be apparent from FIG. 8, being visible from the exterior of the hinged cover for the control box 56. It will be noted, particularly from FIG. 8, that the electrical components of the control are all located in the control housing 56 which may be locked closed and inaccessible to operators obtaining product delivery at unattended delivery installations. Only the orifices 24, 27 and 29 are mounted on the ticket printer.

Figure 5:
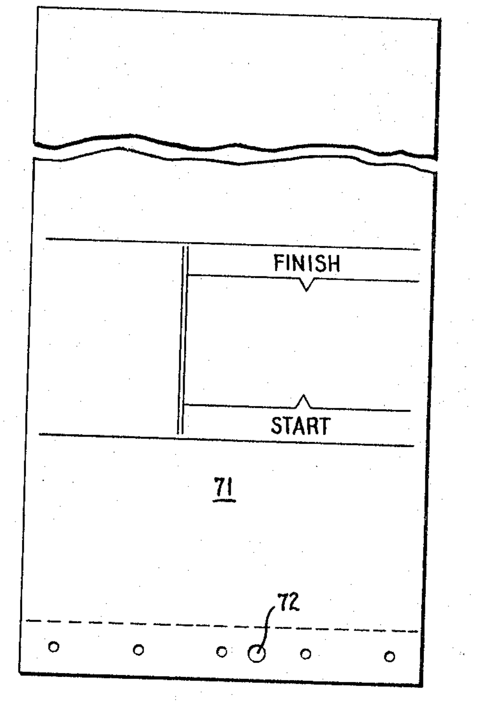
FIG. 5 is a top plan view of an invoice-ticket of the type used with the control of the present invention.

Referring to FIG. 5, the invoice-ticket indicated at 71 is of conventional style having spaced areas on it to accommodate the starting printing numbers and the finish printing numbers provided by the coaction of the stamping pad 17 and the number wheels 18. The ticket differs only from conventional tickets in that it is provided with an aperture 72 through the ticket, this aperture serving as the identifying character which indicates an authentic invoice-ticket. While the aperture 72 need not necessarily appear at the precise location on the ticket indicated in FIG. 5, it will be understood that its location must correspond in alignment with the location of the orifice 27 with which the aperture registers when the table 12 is in "start-print" position. Flexibility in placement of the orifice 72 on the ticket 71 and in the placement of the orifice 27 on the ticket printer provides a means for keying certain invoice-tickets to particular printers as is sometimes desirable.

Figure 3:
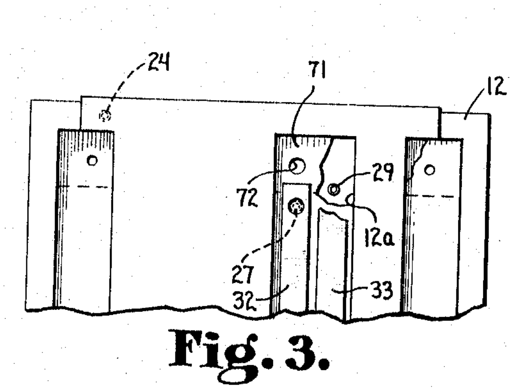
FIG. 3 is a fragmentary, top plan view showing the ticket-receiving table in the initial or "finish-print" position, a portion of the invoice ticket being broken away to better show the underlying parts.

In operation, an operator inserts an authentic invoice-ticket into the slot 17 of the printer. This places the ticket 71 (indicated broken away in FIG. 2) on the table 12 and beneath the plate 31 carried by the table. The ticket overlies and obstructs both orifices 27 and 29. The table 12 is in its initial position of FIG. 2 and, in this position, the table obstructs the orifice 24. This initial positioning of the ticket on the table 12 is also shown in detail in FIG. 3. With all three orifices obstructed, as will be evident from FIG. 6, although switch contacts 43 will be closed, the contacts 46 and 41 will be open because of the pressure rise in the air lines 37 and 36 due to the obstruction of orifices 29 and 24. Assuming the switch 57 is in position so as to connect wires 51 and 59, the relay coil 62 thus cannot be energized and the product delivery pump 66 cannot be operated. The operator then rotates the crank 13 and this functions to shift the table 12, carrying the ticket 71, rightwardly as viewed in FIG. 2.

Figure 4:
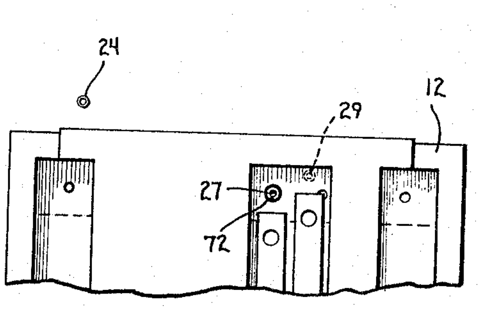
FIG. 4 is a view similar to FIG. 3 but showing the ticket-receiving table in "start-print" position.

This movement of the table 12 places it in its "start-print" position which is illustrated in FIG. 4. In this position the stamp pad is tripped so that it descends sharply upon the ticket printing the numerals appearing on the wheels 18 thereon. As will be evident from FIG. 4, when the table is in the "start-print" position, the aperture 72 in the ticket registers with the orifice 27 so that the orifice is unobstructed, and the table 12 is spaced from the orifice 24 so that it also is unobstructed. The orifice 29 remains obstructed by the ticket. As will be evident from FIGS. 6 and 7, under these conditions, switch contacts 43 will remain closed and, because of the drop in pressure in lines 38 and 36, the switches 46 and 41 will be closed thus energizing relay coil 62 and closing switch 63. The operator may then energize the pump 66 and begin delivery of the product by pushing the start button of the switch 64 which is located adjacent the printer.

The product is delivered until the pump is de-energized by actuation of the stop button of the switch 64 by the operator. After thus de-energizing the pump 66 by manipulation of the switch 64, the operator turns the crank 13 on the printer further and this returns the table 12, with the ticket 71 carried thereby, to the "finish-print" position which physically coincides with the initial position illustrated in FIGS. 2 and 3. Return to this "finish-print" position again trips the stamping pad 17 so that it imprints numbers from the wheels 18 (which have revolved with product delivery) on the ticket 71. The ticket seal pin 22, which had impaled the ticket preventing its withdrawal when movement into the "start-print" position began, is now withdrawn from the ticket, permitting removal of the ticket from the printer. The orifice 24 is now again obstructed by the frame, raising the pressure in the line 36, so that switch 41 is open to disable the energizing circuit for the relay coil 62 and consequently the pump 66.

Primarily, it will be noted, the function of the orifice arrangement and accompanying control elements is to assure that the product delivery means cannot be operated unless an invoice ticket having the proper character, that is, a properly positioned aperture therein, is presented to the printer. If the ticket utilized in the printer does not carry an aperture 72, properly positioned with relation to the orifice 27, when the table 12 is in "start-print" position, the orifice 27 will remain obstructed by the ticket and the switch contacts 46 will remain open preventing operation of the product delivery means. The presence of the orifice 24 assures that the product delivery means cannot be energized unless the printer table 12 has first been placed in "start-print" position (the position of FIG. 4). The orifice 29 senses or assures that a ticket has been fully inserted into the printer before operation of the product delivery means can occur. Without the presence of orifice 29 the printer could be operated by inserting a ticket only partially into it, leaving the orifice 27 clear, and this operation of the printer would setup the energizing circuit for the product delivery means. The orifice 29 assures that product delivery cannot occur unless a ticket is properly positioned within the printer and orifice 27 assures that operation of the product delivery means cannot occur unless a properly authenticated or characterized ticket is in the printer. It will be evident that the monitoring functions of orifices 27 and 29 could be obtained even in a simplified arrangement in which the orifice 24 was eliminated for installations where assurance that the table was in "start-print" position before product delivery could be started might be dispensed with.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. In a registering counter for totaling product delivery of the type having a movable, invoice ticket-receiving table manually movable between an initial position, a start-print position and a finish-print position, and adapted to print a starting product condition indicia on an invoice ticket accommodated on the ticket-receiving table when in start-print position and to print a finish product condition indicia on the invoice ticket when the ticket-receiving table is in finish-print position, a means for preventing unauthorized product delivery comprising: a first air pressure line terminating in a first orifice adjacent to and obstructed by the ticket-receiving table when in either its initial or its finish-print positions, a second and a third air pressure line terminating in a second and a third orifice, respectively, which are adjacent to said table but unobstructed thereby in any of the table positions, a source of control air pressure for pressurizing all three of said air pressure lines, first and second pressure responsive switches closed upon a predetermined pressure decrease in said first and second air pressure lines respectively, a third pressure responsive switch closed upon a predetermined pressure increase in said third air pressure line, a product delivery controller operable when electrically energized to deliver a product from storage, circuit means connecting said first, second and third pressure responsive switches and said product delivery controller with a source of electrical power whereby said controller is energized only when all three of said pressure responsive switches are closed, and an invoice ticket adapted to be accommodated on the ticket-receiving table having an aperture therethrough which registers with said second orifice when the table is in its start-print position, said third orifice being positioned relative to the ticket-receiving table so as to be obstructed by said invoice ticket only when said ticket is in proper position on the table, whereby said pressure responsive switches can energize said product delivery controller only when the ticket-receiving table has properly positioned on it said apertured invoice ticket and the ticket-receiving table is in its start-print position.

2. In a registering counter for totaling product delivery of the type having a movable, invoice ticket-receiving table manually movable between an initial position, a start-print position and a finish-print position, and adapted to print a starting product condition indicia on an invoice ticket accommodated on the ticket-receiving table when in start-print position and to print a finish product condition indicia on the invoice ticket when the ticket-receiving table is in finish-print position, a means for preventing unauthorized product delivery comprising: a first control fluid pressure line communicating with a first orifice adjacent to and obstructed by the ticket-receiving table when in either its initial or its finish-print positions, a second and a third control fluid pressure line communicating with a second and a third orifice, respectively, which are adjacent to said table but unobstructed thereby in any of the table positions, a source of control fluid pressure for pressurizing all three of said pressure lines, first and second pressure responsive switches closed upon a predetermined pressure decrease in said first and second pressure lines respectively, a third pressure responsive switch closed upon a predetermined pressure increase in said third pressure line, a product delivery controller operable when electrically energized to deliver a product from storage, circuit means connecting said first, second and third pressure responsive switches and said product delivery controller with a source of electrical power whereby said controller is energized only when all three of said pressure responsive switches are closed, and an invoice ticket adapted to be accommodated on the ticket-receiving table having an aperture therethrough which registers with said second orifice when the table is in its start-print position, said third orifice being positioned relative to the ticket-receiving table so as to be obstructed by said invoice ticket only when said ticket is in proper position on the table, whereby said pressure responsive switches can energize said product delivery controller only when the ticket-receiving table has properly positioned on it said apertured invoice ticket and the ticket-receiving table is in its start-print position.

3. In a registering counter for totaling product delivery of the type having a movable, invoice ticket-receiving table manually movable between an initial position, a start-print position and a finish-print position, and adapted to print a starting product condition indicia on an invoice ticket accommodated on the ticket-receiving table when in start-print position and to print a finish product condition indicia on the invoice ticket when the ticket-receiving table is in finish-print position, a means for preventing unauthorized product delivery comprising: air pressure lines terminating in a ticket aperture sensing orifice and a ticket position sensing orifice, which are adjacent to said table but unobstructed thereby in any of the table positions, a source of control air pressure for pressurizing said air pressure lines, a pressure responsive switch closed upon a predetermined pressure decrease at said ticket aperture sensing orifice, a further pressure responsive switch closed upon a predetermined pressure increase at said ticket position sensing orifice, a product delivery controller operable when electrically energized to deliver a product from storage, circuit means connecting both of said pressure responsive switches and said product delivery controller with a source of electrical power whereby said controller is energized only when both of said pressure responsive switches are closed, and an invoice ticket adapted to be accommodated on the ticket-receiving table having an aperture therethrough which registers with said ticket aperture sensing orifice when the table is in its start-print position, said ticket position sensing orifice being positioned relative to the ticket-receiving table so as to be obstructed by said invoice ticket only when said ticket is in proper position on the table, whereby said pressure responsive switches can energize said product delivery controller only when the ticket-receiving table has properly positioned on it said apertured invoice ticket and the ticket-receiving table is in its start-print position.

4. In a registering counter for totaling product delivery of the type having a movable, invoice ticket-receiving table manually movable between an initial position, a start-print position and a finish-print position, and adapted to print a starting product condition indicia on an invoice ticket accommodated on the ticket-receiving table when in start-print position and to print a finish product condition indicia on the invoice ticket when the ticket-receiving table is in finish print position, a means for preventing unauthorized product delivery comprising: a first pneumatic means adjacent to and actuated by the ticket-receiving table when in its start-print position, a second and a third pneumatic means, which are adjacent to said table but are not actuated thereby in any of the table positions, a source of control air pressure for pressurizing all three of said pneumatic means, first and second presusre responsive switches closed upon actuation of said first and second pneumatic means respectively, a third pressure responsive switch closed upon actuation of said third pneumatic means, a product delivery controller operable when electrically energized to deliver a product from storage, circuit means connecting said first, second and third pressure responsive switches and said product delivery controller with a source of electrical power whereby said controller is energized only when all three of said pressure responsive switches are closed, and an invoice ticket adapted to be accommodated on the ticket-receiving table having an aperture therethrough which cooperates with said second pneumatic means to actuate it when the table is in its start-print position, said third pneumatic means being positioned relative to the ticket-receiving table so as to be actuated by said invoice ticket only when said ticket is in proper position on the table, whereby said pressure responsive switches can energize said product delivery controller only when the ticket-receiving table has properly positioned on it said apertured invoice ticket and the ticket-receiving table is in its start-print position.

5. In a registering counter for totaling product delivery of the type having a movable, invoice ticket-receiving table manually movable between an initial position, a start-print position and a finish-print position, and adapted to print a starting product condition indicia on an invoice ticket accommodated on the ticket-receiving table when in start-print position and to print a finish product condition indicia on the invoice ticket when the ticket-receiving table is in finish print position, a means for preventing unauthorized product delivery comprising: a ticket identification pneumatic means and a ticket position sensing pneumatic means which are adjacent to said table but are not actuated thereby in any of the table positions, a source of control air pressure for pressurizing said pneumatic means, a pressure responsive switch closed upon actuation of said ticket identification pneumatic means, a further pressure responsive switch closed upon actuation of said ticket position sensing pneumatic means, a product delivery controller operable when electrically energized to deliver a product from storage, circuit means connecting said pressure responsive switches and said product delivery controller with a source of electrical power whereby said controller is energized only when both of said pressure responsive switches are closed, and an invoice ticket adapted to be accommodated on the ticket-receiving table having an aperture therethrough which cooperates with said ticket identification pneumatic means to actuate it when the table is in its start-print position, said ticket position sensing pneumatic means being positioned relative to the ticket-receiving table so as to be actuated by said invoice ticket only when said ticket is in proper position on the table, whereby said pressure responsive switches can energize said product delivery controller only when the ticket-receiving table has properly positioned on it said apertured invoice ticket and the ticket-receiving table is in its start-print position.

References Cited by the Examiner

UNITED STATES PATENTS

| | | | |
|---|---|---|---|
| Re. 25,254 | 10/1962 | Harris | 222—2 |
| 1,115,383 | 10/1914 | Bocker | 84—6 |
| 3,221,860 | 12/1965 | Klaffky | 194—5 |
| 3,255,339 | 6/1966 | Rausing | 194—5 X |
| 3,270,960 | 9/1966 | Phillips | 235—201 |

FOREIGN PATENTS

| | | |
|---|---|---|
| 1,362,309 | 7/1963 | France. |

OTHER REFERENCES

IBM Tech. Disclosure Bulletin, vol. 8, No. 4, September 1965.

ROBERT B. REEVES, *Primary Examiner.*

N. L. STACK, *Assistant Examiner.*